US012434478B2

(12) United States Patent
North et al.

(10) Patent No.: US 12,434,478 B2
(45) Date of Patent: Oct. 7, 2025

(54) COMPACT INKJET NOZZLE DEVICE WITH HIGH DEGREE OF SYMMETRY

(71) Applicant: Memjet Technology Limited, Dublin (IE)

(72) Inventors: Angus John North, North Ryde (AU); Samuel George Mallinson, North Ryde (AU); Graeme Lowe, North Ryde (AU)

(73) Assignee: Memjet Technology Limited, Dublin (IE)

( * ) Notice: Subject to any disclaimer, the term of this patent is extended or adjusted under 35 U.S.C. 154(b) by 176 days.

(21) Appl. No.: 18/449,556

(22) Filed: Aug. 14, 2023

(65) Prior Publication Data

US 2024/0059070 A1 Feb. 22, 2024

Related U.S. Application Data

(60) Provisional application No. 63/398,749, filed on Aug. 17, 2022.

(51) Int. Cl.
*B41J 2/175* (2006.01)
*B41J 2/14* (2006.01)

(52) U.S. Cl.
CPC ................ *B41J 2/175* (2013.01); *B41J 2/14* (2013.01); *B41J 2002/14467* (2013.01); *B41J 2002/14475* (2013.01); *B41J 2202/11* (2013.01); *B41J 2202/16* (2013.01)

(58) Field of Classification Search
CPC .... B41J 2/175; B41J 2/14; B41J 2002/14467; B41J 2002/14475; B41J 2202/11; B41J 2202/16; B41J 2/1404
See application file for complete search history.

(56) References Cited

U.S. PATENT DOCUMENTS

2002/0057315 A1* 5/2002 Touge .................... B41J 2/1404 347/65
2015/0251421 A1* 9/2015 Mallinson ............. B41J 2/1412 347/61

* cited by examiner

*Primary Examiner* — Henok D Legesse
(74) *Attorney, Agent, or Firm* — Garson & Gutierrez, PC

(57) ABSTRACT

An inkjet nozzle device includes a main chamber having a floor, a roof and a perimeter wall extending between the floor and the roof. The main chamber includes: a firing chamber having a nozzle aperture defined in the roof and a bar heater for ejection of ink through the nozzle aperture; an antechamber for supplying ink to the firing chamber, the antechamber having a chamber inlet defined in the floor; and a baffle plate extending parallel with the bar heater, which partitions the main chamber to define the firing chamber and the antechamber. The nozzle device has mirror symmetry about a symmetry plane extending perpendicular to the longitudinal axes of the bar heater and the baffle plate.

15 Claims, 3 Drawing Sheets

COMPACT INKJET NOZZLE DEVICE WITH HIGH DEGREE OF SYMMETRY

CROSS REFERENCE TO RELATED APPLICATIONS

This application claims priority to and the benefit of U.S. Provisional Patent Application No. 63/398,749, entitled COMPACT INKJET NOZZLE DEVICE WITH HIGH DEGREE OF SYMMETRY, filed on Aug. 17, 2022, the disclosure of which is incorporated herein by reference in its entirety for all purposes.

FIELD OF THE INVENTION

This invention relates to inkjet nozzle devices for inkjet printheads. It has been developed primarily to provide consistent droplet ejection trajectories and rapid chamber refill rates in a versatile, compact MEMS device that enables minimal inter-row nozzle spacing in an inkjet printhead.

BACKGROUND OF THE INVENTION

The Applicant has developed a range of Memjet® inkjet printers as described in, for example, WO2011/143700, WO2011/143699 and WO2009/089567, the contents of which are herein incorporated by reference. Memjet® printers employ a stationary page width printhead in combination with a feed mechanism which feeds print media past the printhead in a single pass. Memjet® printers therefore provide much higher printing speeds than conventional scanning inkjet printers.

An inkjet printhead is usually comprised of rows of individual inkjet nozzle devices, each supplied with ink from a suitable ink source via an ink manifold. Each inkjet nozzle device typically comprises a nozzle chamber having a nozzle aperture and an actuator for ejecting ink through the nozzle aperture. The design space for inkjet nozzle devices is vast and a plethora of different nozzle devices have been described in the patent literature, including different types of actuators and different device configurations.

As described in U.S. Pat. No. 7,407,262 (the contents of which are incorporated herein by reference), inkjet nozzle devices in Memjet® printheads are arranged in pairs of rows supplied with the same ink from a backside ink supply channel. Thus, each pair of rows defines one color channel in the printhead. The two nozzle rows within one color channel are offset from each other for printing odd and even dots on the same line of print, thereby enabling printing at high dpi Minimizing a distance between odd and even nozzle rows within the same color channel is advantageous for a number of reasons, including minimizing a width of the backside ink supply channel supplying ink to both nozzle rows, thereby increasing the structural integrity of the print chip; potentially maximizing a separation between adjacent color channels, thereby reducing problems associated with color mixing on the nozzle face; and/or enabling more efficient use of silicon in the print chip.

U.S. Pat. No. 8,998,383 (the contents of which are incorporated herein by reference) describes a symmetrical inkjet nozzle device combining consistent droplet ejection trajectories with minimal skew and high chamber refill rates with minimal fluidic crosstalk between nearby nozzle devices.

It would be desirable to provide an alternative inkjet nozzle device, which combines the advantages of consistent droplet ejection trajectories, high chamber refill rates and minimal fluidic crosstalk (as described in U.S. Pat. No. 8,998,383) with a more compact MEMS footprint that provides minimal inter-row spacing within each color channel of a print chip or printhead. It would be further desirable for such a MEMS nozzle device to be compatible with existing CMOS circuitry used in commercially available printheads. Backwards compatibility with existing CMOS circuitry obviates an entire redesign of existing print chips, thereby minimizing productions costs and development time.

SUMMARY OF THE INVENTION

In accordance with the present invention, there is provided an inkjet nozzle device comprising an elongate main chamber having a floor, a roof and a perimeter wall extending between the floor and the roof, the perimeter wall having a pair of longer sidewalls and a pair of shorter end walls, the main chamber comprising:

- a firing chamber disposed towards one of the sidewalls, the firing chamber having a nozzle aperture defined in the roof and an elongate bar heater for ejection of ink through the nozzle aperture, the bar heater having a longitudinal axis;
- an antechamber disposed towards an opposite sidewall for supplying ink to the firing chamber, the antechamber having at least one chamber inlet defined in the floor; and
- an elongate baffle plate having a longitudinal axis extending parallel with the longitudinal axis of the bar heater, the baffle plate partitioning the main chamber to define the firing chamber and the antechamber, wherein the inkjet nozzle device has mirror symmetry about a symmetry plane extending perpendicular to the longitudinal axes of the bar heater and the baffle plate.

Inkjet nozzle devices according to the present invention have a high degree of symmetry about a nominal x-axis for consistent droplet ejection trajectories. In contrast with the devices described in U.S. Pat. No. 8,998,383, the elongate baffle plate is positioned laterally with respect to the bar heater and extends parallel with a longitudinal axis of the bar heater. Thus, the device has mirror symmetry about an axis bisecting the long axes of the bar heater and the baffle plate—that is, mirror symmetry about a plane perpendicular to the longer sidewalls of the main chamber.

Furthermore, the inkjet nozzle devices have a compact configuration, which minimizes a footprint of each device and minimizes a length of each device along a nominal y-axis parallel with the longer sidewalls. Accordingly, the inkjet nozzle device can achieve a closer inter-row spacing than the devices described in, for example, U.S. Pat. No. 8,998,383. This, in turn, enables a width of backside ink supply channels to be minimized and potentially maximizes separation between adjacent color channels. Furthermore, the inkjet nozzle devices enable MEMS compatibility with CMOS control circuitry of existing print chips, such as those used in Memjet Versapass® printheads.

At the same time, the inkjet nozzle devices described herein enjoy similar advantages to the devices described in U.S. Pat. No. 8,998,383. Bubble formation is constrained between the baffle plate and one sidewall, and the high degree of symmetry minimizes skewing of droplet trajectories, thereby minimizing the risk of droplet tails catching on an edge of the nozzle aperture and causing flooding of the nozzle plate. The chamber inlet defined in the floor enables high chamber refill rates for high frequency droplet ejections. And neighboring devices are effectively fluidically isolated by virtue of the perimeter wall, with the floor inlet into the antechamber providing a tortuous fluidic path between nearby devices to minimize backflow and fluidic crosstalk.

Preferably, the floor and the roof are common to the firing chamber and the antechamber.

Preferably, the symmetry plane bisects the nozzle aperture, the bar heater and the baffle plate.

In one embodiment, the antechamber has a single chamber inlet and the symmetry plane bisects the single chamber inlet. In this embodiment, the single chamber inlet is generally elongate having a length dimension (in plan view) longer than a length dimension of the nozzle aperture.

In another embodiment, the antechamber has first and second chamber inlets positioned towards respective first and second opposite ends of the baffle plate. In this embodiment, the first and second chamber inlets are equidistant from the symmetry plane thereby maintaining overall symmetry about the nominal x-axis.

Preferably, each of the first and second chamber inlets has a higher capillary pressure than the nozzle aperture. Typically, each of the first and second chamber inlets has a smaller area (and consequently a larger curvature) than the nozzle aperture to achieve the higher capillary pressure relative to the nozzle aperture. The higher capillary pressure of the chamber inlet relative to the nozzle aperture advantageously minimizes any air bubbles entering the antechamber and firing chamber from backside ink supply channels. By minimizing entry of air bubbles into the firing chamber, the risk of the printhead de-priming is advantageously minimized, as will be explained in further detail hereinbelow.

Preferably, the baffle plate has a pair of side edges such that a gap extends between each side edge and the end walls of the main chamber to define a pair of firing chamber entrances flanking the baffle plate. The firing chamber entrances are disposed symmetrically about the symmetry plane.

Preferably, the baffle plate extends beyond the chamber inlet along a longitudinal axis of the inkjet nozzle device. In the embodiment having a single chamber inlet, the baffle plate is longer than the chamber inlet. In the alternative embodiment having a pair of chamber inlets, both chamber inlets are wholly positioned within the longitudinal extent of the baffle plate.

Preferably, the nozzle aperture is elongate having a longitudinal axis perpendicular to the plane of symmetry. Typically, the nozzle aperture is elliptical having a major axis coincident with the longitudinal axis of the bar heater and perpendicular to the plane of symmetry.

Preferably, the baffle plate has a length dimension greater than a length dimension of the nozzle aperture along its major axis.

Preferably, the baffle plate has a length of at least 80% or at least 90% of a length of the bar heater. Typically, the baffle plate is substantially coextensive with the bar heater along its length dimension. This arrangement maximizes the symmetry of bubble growth during nozzle firing, thereby minimizing skewing of droplet ejections.

Preferably, at least part of the chamber inlet extends beyond each end of the nozzle aperture along its major axis, in plan view. This arrangement advantageously minimizes a flow path length, and consequently flow resistance, between the chamber inlet(s) and the firing chamber having the nozzle aperture. In the embodiment having a single chamber inlet, opposite ends of the chamber inlet extend towards the firing chamber entrances flanking the baffle plate; in the alternative embodiment having a pair of chamber inlets, the first and second chamber inlets are positioned towards respective firing chamber entrances.

Preferably, a length of the bar heater is at least 70% or at least 80% of a total length of the main chamber and the nozzle device. Accordingly, the overall length of the inkjet nozzle device along a nominal y-axis is minimized.

Preferably, the firing chamber has a larger volume than the antechamber.

Preferably, the perimeter wall and the baffle plate are comprised of a same material, for example by virtue of being co-deposited during fabrication of the device. Typically, the perimeter wall and baffle plate are defined via a subtractive MEMS process, in which the wall material is deposited as a blanket layer and then etched to define the perimeter wall and baffle plate (see, for example, the subtractive MEMS fabrication process described in U.S. Pat. No. 7,819,503, the contents of which are herein incorporated by reference).

The perimeter wall and the baffle plate may be comprised of any suitable material, including polymers (e.g., epoxy-based photoresists, such as SU-8) and ceramics. Preferably, the perimeter wall and baffle plate are comprised of a ceramic material selected from the group consisting of silicon oxide, silicon nitride and combinations thereof.

Likewise, the roof may be comprised of any suitable material, including the polymers and ceramics described above. The roof may be comprised of a same material as the perimeter wall and baffle plate, or a different material. Typically, a nozzle plate spans across a plurality of nozzle devices in a print chip to define the roofs of each nozzle device. The nozzle plate may be uncoated or coated with a hydrophobic coating, such as a polymer coating, using a suitable deposition process (see, for example, the nozzle plate coating process described in U.S. Pat. No. 8,012,363, the contents of which are herein incorporated by reference).

In a second aspect, there is provided a print chip comprising at least one pair of nozzle rows, each nozzle row comprising a plurality of inkjet nozzle devices as described above, and wherein the nozzle apertures, baffle plates and bar heaters of said inkjet nozzle devices are co-aligned along a direction of each nozzle row—that is, the nozzle apertures, baffle plates and bar heaters all overlap along the direction of each nozzle row (x-axis), and the symmetry plane likewise extends along each nozzle row.

Preferably, the chamber inlets of the pair of nozzle rows meet with a common backside ink supply channel of the print chip, the backside ink supply channel supplying a same ink to each inkjet nozzle device in the pair of nozzle rows.

An inkjet printhead may comprise a plurality of print chips, for example, in a butting arrangement as described in U.S. Pat. No. 7,407,262, the contents of which are incorporated herein by reference.

As used herein, the term "ink" is taken to mean any printing fluid, which may be printed from an inkjet printhead. The ink may or may not contain a colorant. Accordingly, the term "ink" may include conventional dye-based or pigment-based inks, infrared inks, fixatives (e.g. pre-coats and finishers), 3D printing fluids, biological fluids and the like.

While the terms "symmetry", "symmetrical" and the like are used herein, it will of course be appreciated that, in practice, minor imperfections may exist in devices according to the present invention due to, for example, manufacturing tolerances. Accordingly, it will be appreciated that substantially symmetrical devices having equivalent functionality to the symmetrical devices described herein are within the ambit of the present invention.

BRIEF DESCRIPTION OF THE DRAWINGS

Embodiments of the present invention will now be described by way of example only with reference to the accompanying drawings, in which.

DETAILED DESCRIPTION OF THE INVENTION

First Embodiment (Single Chamber Inlet)

Figure 1:
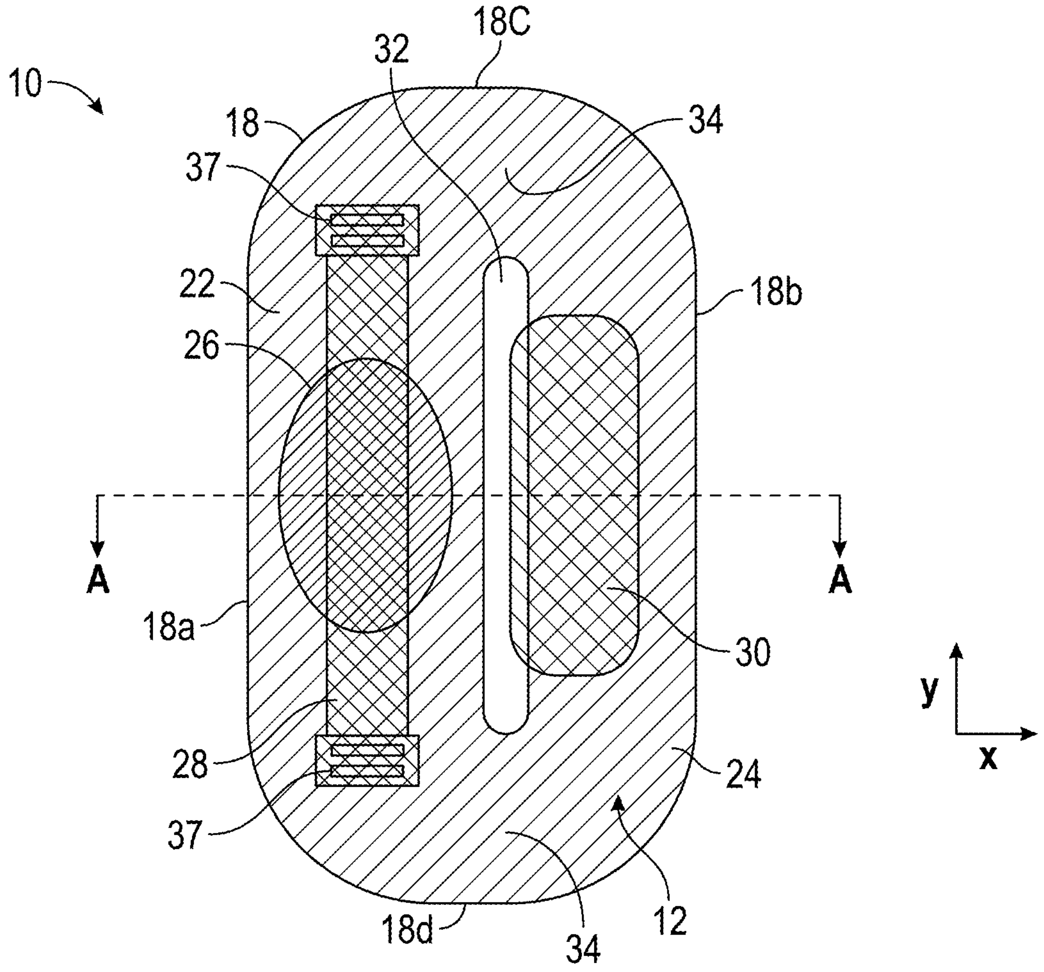
FIG. 1 is a plan view of an inkjet nozzle device according to a first embodiment.
Figure 2:
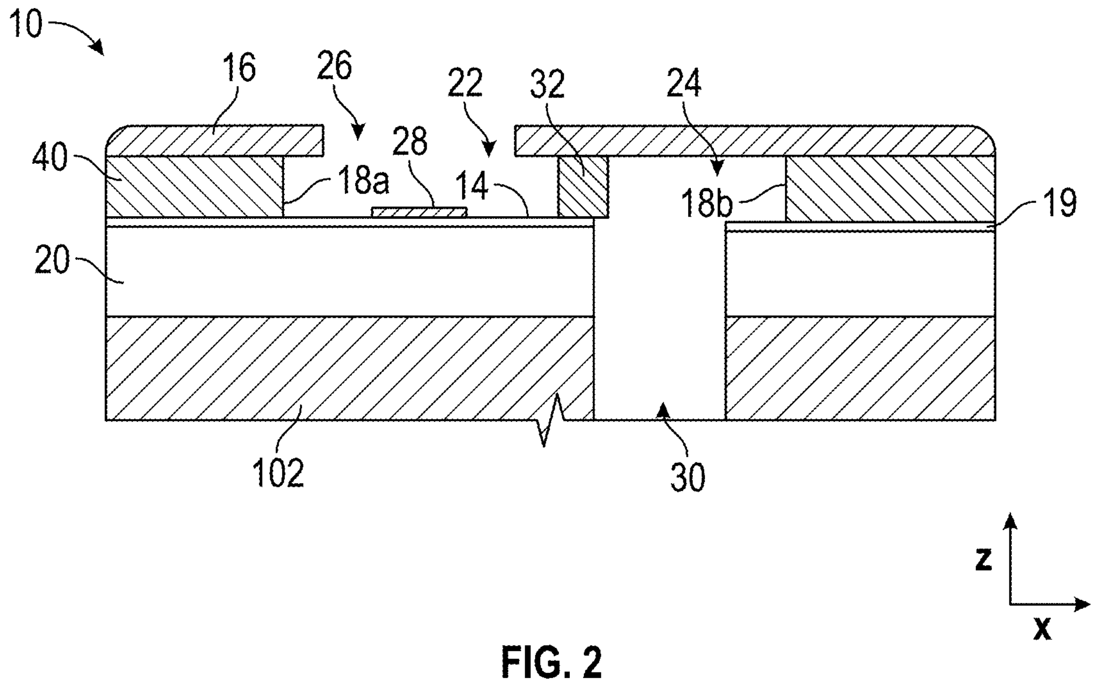
FIG. 2 is a sectional view through line A-A of the inkjet nozzle device shown in FIG. 1.

Referring to FIGS. 1 and 2, there is shown an inkjet nozzle device 10 according to a first embodiment. The inkjet nozzle device 10 comprises a main chamber 12 having a floor 14, a roof 16 and a continuous perimeter wall 18 extending between the floor and the roof. The perimeter wall 18 encircling the main chamber 12, defines a generally elongate main chamber, which takes the form, in plan view, of an oblong having rounded corners. The perimeter wall 18 comprises a pair of opposite sidewalls 18*a* and 18*b* extending longitudinally parallel with a nominal y-axis and a pair of opposite end walls 18*c* and 18*d* curvedly interconnecting the sidewalls.

The floor 14 is defined by a passivation layer 19 covering a CMOS layer 20 containing drive circuitry for the nozzle device 10. The CMOS layer 20 may comprise a plurality of metal layers interspersed with interlayer dielectric (ILD) layers, as known to those skilled in the art. Typically, the roof 16 and perimeter wall 18 are comprised of ceramic materials, which may be the same or different from each other (e.g., silicon dioxide, silicon nitride, etc.).

The main chamber 12 of the nozzle device 10 comprises a firing chamber 22 and an antechamber 24. The firing chamber 22 comprises an elliptical nozzle aperture 26 defined in the roof 16 and an actuator in the form of a resistive bar heater 28 bonded to the floor 14. The antechamber 24 comprises a chamber inlet 30 defined in the floor 14.

An elongate baffle plate 32 (or "baffle wall"), having a height dimension extending between the floor 14 and the roof 16, partitions the main chamber 12 to define the firing chamber 22 and the antechamber 24. The baffle plate 32 is positioned laterally adjacent the bar heater 28 and extends lengthwise parallel to the bar heater—that is, along the nominal y-axis. The baffle plate 32 and bar heater 28 are substantially coextensive with each other along the y-axis. Rounded ends of the baffle plate 32 advantageously minimize mechanical stresses and reduce the risk of roof cracking during fabrication and operation of the device.

The nozzle device 10 has a plane of symmetry extending along a nominal x-axis of the main chamber 12 to provide mirror symmetry about the x-axis. The plane of symmetry is indicated by the broken line A-A in FIG. 1, which is coincident with a minor axis and bisects a major axis of the elliptical nozzle aperture 26, as well as bisecting the longitudinal axes of the heater element 28, the baffle plate 32 and the chamber inlet 30.

The antechamber 24 fluidically communicates with the firing chamber 22 via a pair of firing chamber entrances 34 which flank the baffle plate 32 at opposite ends thereof. Each firing chamber entrance 34 is defined by a gap defined between respective ends of the baffle plate 32 and the end walls 18*c* and 18*d* of the main chamber 12. Typically, the baffle plate 32 occupies about most of the length (e.g., at least 60% of the length) of the main chamber 12 along the y-axis. In plan view, the baffle plate 32 fully shields the chamber inlet 30 from the bar heater 28.

The nozzle aperture 26 is elongate and takes the form of an ellipse having a major axis extending along the y-axis and a minor axis coincident with the plane of symmetry A-A and extending along the x-axis. A longitudinal axis of the heater element 28 is coincident with a major axis of the elliptical nozzle aperture 26, while the plane of symmetry A-A bisects the bar heater 28 across its longitudinal axis. Typically, the centroid of the nozzle aperture 26 is aligned with the centroid of the bar heater 28.

The bar heater 28 is connected at each end thereof to respective electrodes in the CMOS layer 20 by one or more vias 37 defined through the floor 14. The bar heater 28 may be comprised of any suitable resistive material, for example, a titanium-aluminum alloy, titanium aluminum nitride etc. In one embodiment, the bar heater 28 is coated with one or more protective layers, as described in U.S. Pat. No. 9,573,368, the contents of which are incorporated herein by reference.

The vias 37 may be filled with any suitable conductive material (e.g., copper, aluminum, tungsten etc.) to provide electrical connection between the heater element 28 and an upper metal layer of the CMOS layer 20. A suitable process for forming electrode connections from the heater element 28 to the CMOS layer 20 is described in U.S. Pat. No. 8,453,329, the contents of which are incorporated herein by reference.

As shown most clearly in FIG. 2, the main chamber 12 is defined in a blanket layer of wall material 40 deposited onto the passivation layer 19 by a suitable etching process (e.g., plasma etching, wet etching, photo etching etc.). The baffle plate 32 and the perimeter wall 18 are defined simultaneously by this etching process, which simplifies the overall MEMS fabrication process. Hence, the baffle plate 32 and perimeter wall 18 are comprised of the same wall material, which may be any suitable etchable ceramic or polymer material suitable for use in printheads.

Figure 3:
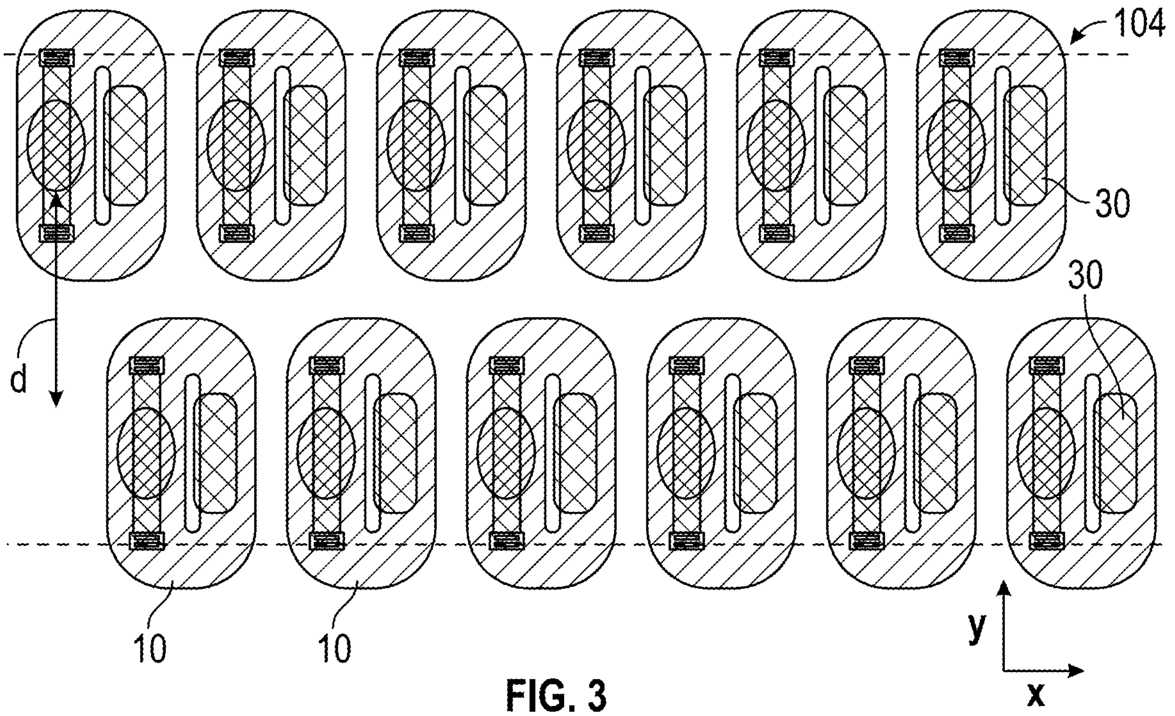
FIG. 3 is a plan view of a pair of nozzle rows in a print chip.

A print chip may be comprised of a silicon substrate 102 having the CMOS layer 20 and a plurality of the inkjet nozzle devices 10 arranged in rows, such as the pair of nozzle rows shown in FIG. 3. The chamber inlet 30 of each nozzle device 10 meets with a relatively wider ink supply channel 104 defined in a backside of the print chip. As shown in FIG. 3, the pair of nozzle rows are arranged for printing odd and even dots and a common backside ink supply channel 104 for supplying ink to each nozzle row is shown in dotted outline. The ink supply channel 104 supplies ink to the odd and even nozzle rows via respective chamber inlets 30 of the nozzle devices 10, as described in U.S. Pat. No. 7,441,865 (the contents of which are incorporated herein by reference).

The advantages of the nozzle device 10 are like those of the nozzle devices described in U.S. Pat. No. 8,998,383. However, those advantages are achieved with a nozzle device having a minimal MEMS footprint and a minimal dimension along the y-axis. The minimal dimension of each nozzle device 10 along the y-axis enable closer inter-row separation of nozzle apertures 26 in a pair of adjacent nozzle rows, as indicated by double-headed arrow d in FIG. 3.

During droplet ejection, the baffle plate 32 and its opposed sidewall 18*a* of the firing chamber 24 symmetrically constrain the expanding bubble such that ink droplets are ejected with minimal skew along both the x- and y-axes. Furthermore, any backflow and/or fluidic crosstalk during droplet ejection is minimized by virtue of the MEMS design having the baffle plates 32, chamber inlets 30 and backside ink supply channel 104 providing a tortuous fluidic path between neighboring devices.

Second Embodiment (Dual Chamber Inlets)

Figure 4:
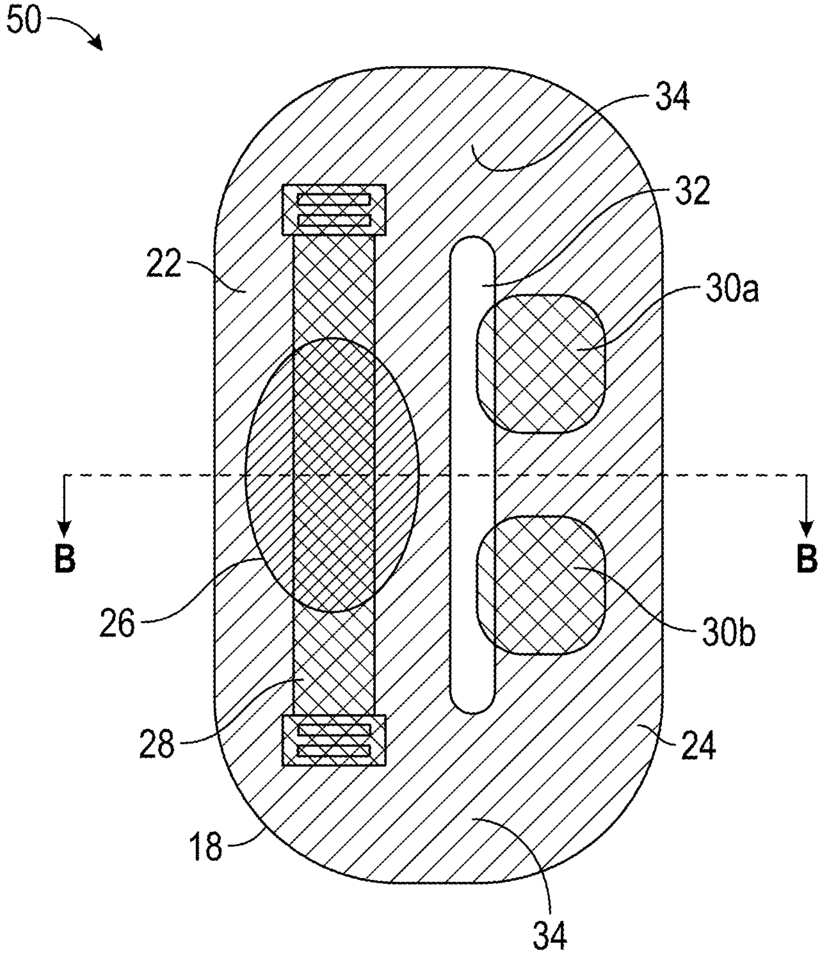
FIG. 4 is a plan view of an inkjet nozzle device according to a second embodiment.
Figure 5:
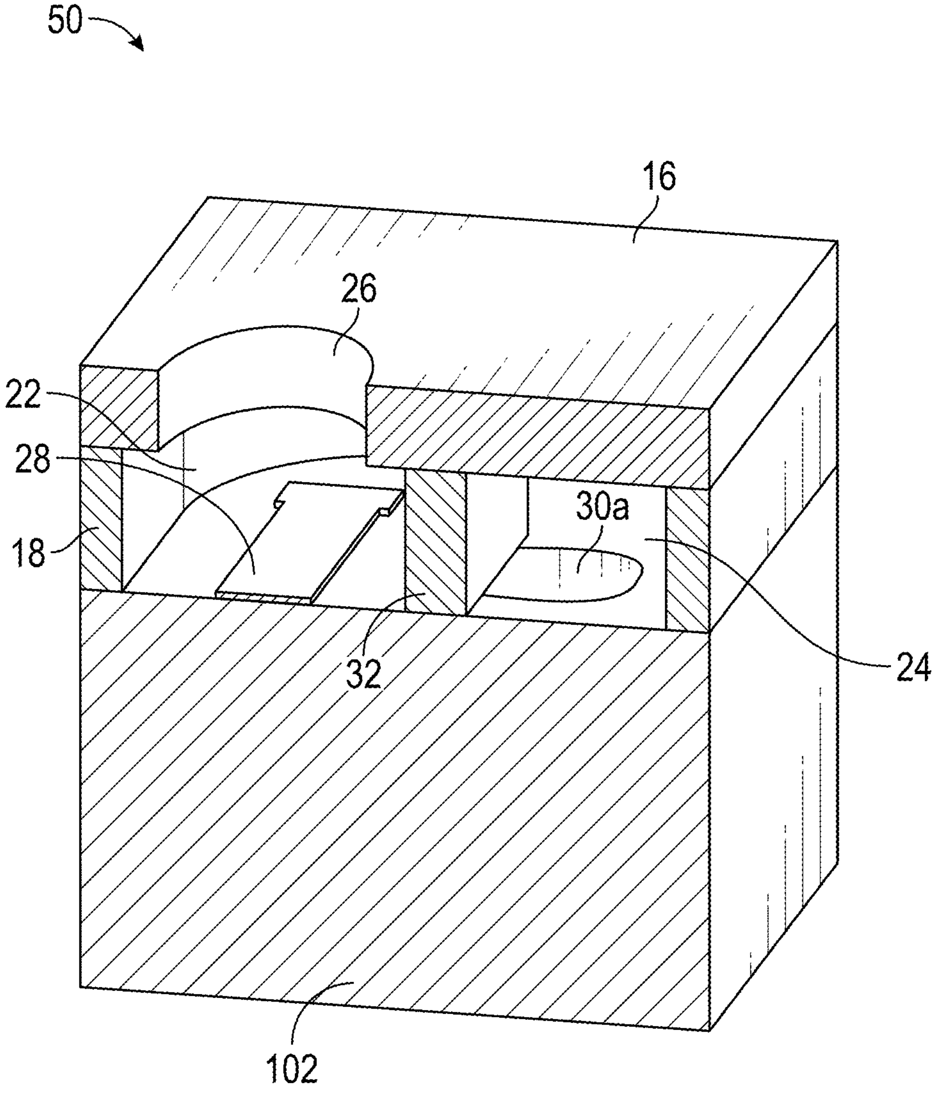
FIG. 5 is sectional perspective through line B-B of the inkjet nozzle device shown in FIG. 4.

Referring to FIGS. 4 and 5, there is shown an inkjet nozzle device 50 according to a second embodiment. The inkjet nozzle device 50 is identical in every respect to the inkjet nozzle device 10 described above in connection with FIGS. 1 and 2, with the exception that the single chamber inlet 30 is replaced with first and second chamber inlets 30*a* and 30*b*.

The first and second chamber inlets 30*a* and 30*b* are identically sized and are disposed at either side of a plane of symmetry (indicated by broken line B-B in FIG. 4) extending along the x-axis of the nozzle device 50. Like the first embodiment, the plane of symmetry B-B bisects the longitudinal axes of the nozzle aperture 26, the bar heater 28 and the baffle plate 32, while the first and second chamber inlets 30*a* and 30*b* are spaced equidistant therefrom in order to maintain overall mirror symmetry in the nozzle device 50.

In contrast with the single chamber inlet 30 described above, each of the first and second chamber inlets 30*a* and 30*b* has a higher capillary pressure than the nozzle aperture 26 by virtue of having a relatively smaller area (and consequently greater curvature) than the nozzle aperture. The relatively higher capillary pressures of the first and second chamber inlets 30*a* and 30*b* advantageously minimizes the risk of de-priming during printhead operation, while still allowing sufficient flow rates into the firing chamber 22 for high frequency operation.

In the inkjet nozzle device 10 shown in FIG. 1, the nozzle aperture 26 has a higher capillary pressure than the chamber inlet 30, potentially allowing nozzle suction to suck air bubbles from backside ink supply channels 104 into the firing chamber 22. This configuration risks connecting a relatively large air bubble in the ink supply channel 104 with atmosphere, consequently risking de-priming of the printhead. Although such risks are minimized when using degassed ink, it is desirable for printheads to be compatible with non-degassed inks, especially in printers employing gravity control of backpressures (such as Memjet® printers described in U.S. Pat. No. 8,740,360).

Accordingly, in the inkjet nozzle device 50, the higher capillary pressure of the first and second chamber inlets 30A and 30B, relative to the nozzle aperture 26, minimizes the risk of nozzle suction drawing air bubbles into the firing chamber 22, with potential de-priming of the printhead. At the same time, flow rates into the antechamber 24 are still sufficient for rapid refilling after each droplet ejection by virtue of the two chamber inlets 30A and 30B, albeit with smaller cross-sectional areas than the single chamber inlet 30. In addition, positioning of the first and second chamber inlets 30A and 30B towards respective firing chamber entrances 34 in the nozzle device 50 minimizes flow resistance between the chamber inlets and the firing chamber 22, thereby maximizing flow rates into the firing chamber and enabling high frequency operation of the device.

It will, of course, be appreciated that the present invention has been described by way of example only and that modifications of detail may be made within the scope of the invention, which is defined in the accompanying claims.

The invention claimed is:

1. An inkjet nozzle device comprising an elongate main chamber having a floor, a roof and a perimeter wall extending between the floor and the roof, the perimeter wall having a pair of longer sidewalls and a pair of shorter endwalls, the main chamber comprising:
- a firing chamber disposed towards one of the sidewalls, the firing chamber having a nozzle aperture defined in the roof and an elongate bar heater for ejection of ink through the nozzle aperture, the bar heater having a longitudinal axis;
- an antechamber disposed towards an opposite sidewall for supplying ink to the firing chamber, the antechamber having first and second chamber inlets defined in the floor; and
- an elongate baffle plate having a longitudinal axis extending parallel with the longitudinal axis of the bar heater, the baffle plate partitioning the main chamber to define the firing chamber and the antechamber, wherein;
- the inkjet nozzle device has mirror symmetry about a symmetry plane extending perpendicular to the longitudinal axes of the bar heater and the baffle plate;
- the symmetry plane bisects the nozzle aperture, the bar heater and the baffle plate;
- the first and second chamber inlets are positioned towards respective first and second opposite ends of the baffle plate; and
- the first and second chamber inlets are equidistant from the symmetry plane.

2. The inkjet nozzle device of claim 1, wherein the floor and the roof are common to the firing chamber and the antechamber.

3. The inkjet nozzle device of claim 1, wherein each of the first and second chamber inlets has a higher capillary pressure than the nozzle aperture.

4. The inkjet nozzle of claim 3, wherein each of the first and second chamber inlets has a smaller area than the nozzle aperture.

5. The inkjet nozzle device of claim 1, wherein the baffle plate extends beyond the chamber inlet along a longitudinal axis of the inkjet nozzle device.

6. The inkjet nozzle device of claim 5, wherein at least part of the chamber inlet extends beyond each end of the nozzle aperture along its major axis.

7. The inkjet nozzle device of claim 1, wherein the nozzle aperture is elongate having a longitudinal axis perpendicular to the plane of symmetry.

8. The inkjet nozzle device of claim 1, wherein the nozzle aperture is elliptical having a major axis parallel to the longitudinal axis of the bar heater and perpendicular symmetry plane.

9. The inkjet nozzle device of claim 8, wherein the baffle plate has a length dimension greater than a length dimension of the nozzle aperture along its major axis.

10. The inkjet nozzle device of claim 1, wherein the baffle plate has a length of at least 80% of a length of the bar heater.

11. The inkjet nozzle device of claim 1, wherein a length of the bar heater is at least 70% of a total length of the inkjet nozzle device.

12. The inkjet nozzle device of claim 1, wherein the perimeter wall and the baffle plate are comprised of a same material.

13. The inkjet nozzle device of claim 1, wherein the firing chamber has a larger volume than the antechamber.

14. A print chip comprising at least one pair of nozzle rows, each nozzle row comprising a plurality of inkjet nozzle devices according to claim 1, and wherein the nozzle apertures, baffle plates and bar heaters of said inkjet nozzle devices are co-aligned along a direction of each nozzle row.

15. A printhead comprising a plurality of print chips according to claim 14.

* * * * *